United States Patent
Cho et al.

(10) Patent No.: US 10,101,603 B2
(45) Date of Patent: Oct. 16, 2018

(54) LIQUID CRYSTAL DISPLAY DEVICE COMPRISING A SCREW-SHAPED COMBINING MEMBER AFFIXING A MIDDLE FRAME TO A COVER BOTTOM THROUGH A FIRST GROOVE OF A CONTACTING PORTION

(71) Applicant: LG DISPLAY CO., LTD., Seoul (KR)

(72) Inventors: Inchul Cho, Paju-si (KR); YongSoo Kim, Paju-si (KR); Daeyoung Jung, Sacheon-si (KR); Daeduk Kim, Paju-si (KR); EuiJung Kim, Goyang-si (KR); GilYoung Lim, Paju-si (KR); Jakyung Goo, Chungcheongnam-do (KR)

(73) Assignee: LG Display Co., Ltd., Seoul (KR)

( * ) Notice: Subject to any disclaimer, the term of this patent is extended or adjusted under 35 U.S.C. 154(b) by 17 days.

(21) Appl. No.: 14/730,102

(22) Filed: Jun. 3, 2015

(65) Prior Publication Data

US 2016/0147107 A1     May 26, 2016

(30) Foreign Application Priority Data

Nov. 24, 2014  (KR) .................. 10-2014-0164176

(51) Int. Cl.
*G02F 1/1333*   (2006.01)

(52) U.S. Cl.
CPC .................. *G02F 1/133308* (2013.01); *G02F 2001/133317* (2013.01); *G02F 2001/133325* (2013.01); *G02F 2201/46* (2013.01)

(58) Field of Classification Search
CPC ... G02F 2001/133317; G02F 1/133308; G02F 2001/133325; G02F 2201/46
See application file for complete search history.

(56) References Cited

U.S. PATENT DOCUMENTS

| | | | |
|---|---|---|---|
| 6,510,226 B1* | 1/2003 | Thomann | H04Q 1/116 379/413.04 |
| 2007/0071579 A1* | 3/2007 | Harnisch | B23Q 1/012 414/14 |
| 2009/0033827 A1* | 2/2009 | Chen | G02B 6/0088 349/58 |
| 2011/0037920 A1* | 2/2011 | Kim | G02F 1/133608 349/58 |
| 2011/0085107 A1* | 4/2011 | Noh | G02B 6/0085 349/61 |
| 2012/0162569 A1* | 6/2012 | Sekiguchi | G02F 1/133308 349/58 |
| 2013/0250203 A1* | 9/2013 | Zhou | G02F 1/133608 349/58 |

* cited by examiner

*Primary Examiner* — Paul Lee
(74) *Attorney, Agent, or Firm* — Fenwick & West LLP

(57) ABSTRACT

A liquid crystal display device comprises a liquid crystal display panel, a back light unit that emits light to the display panel, a middle frame that supports the display panel and is disposed on a side of the back light unit, and a cover bottom that contacts a lower surface of the back light unit. The middle frame includes a contacting portion which makes contact with a portion of an upper surface of the cover bottom, and a protruding portion which adjoins a side surface of the cover bottom and protrudes from the contacting portion toward a bottom surface of the cover bottom.

14 Claims, 8 Drawing Sheets

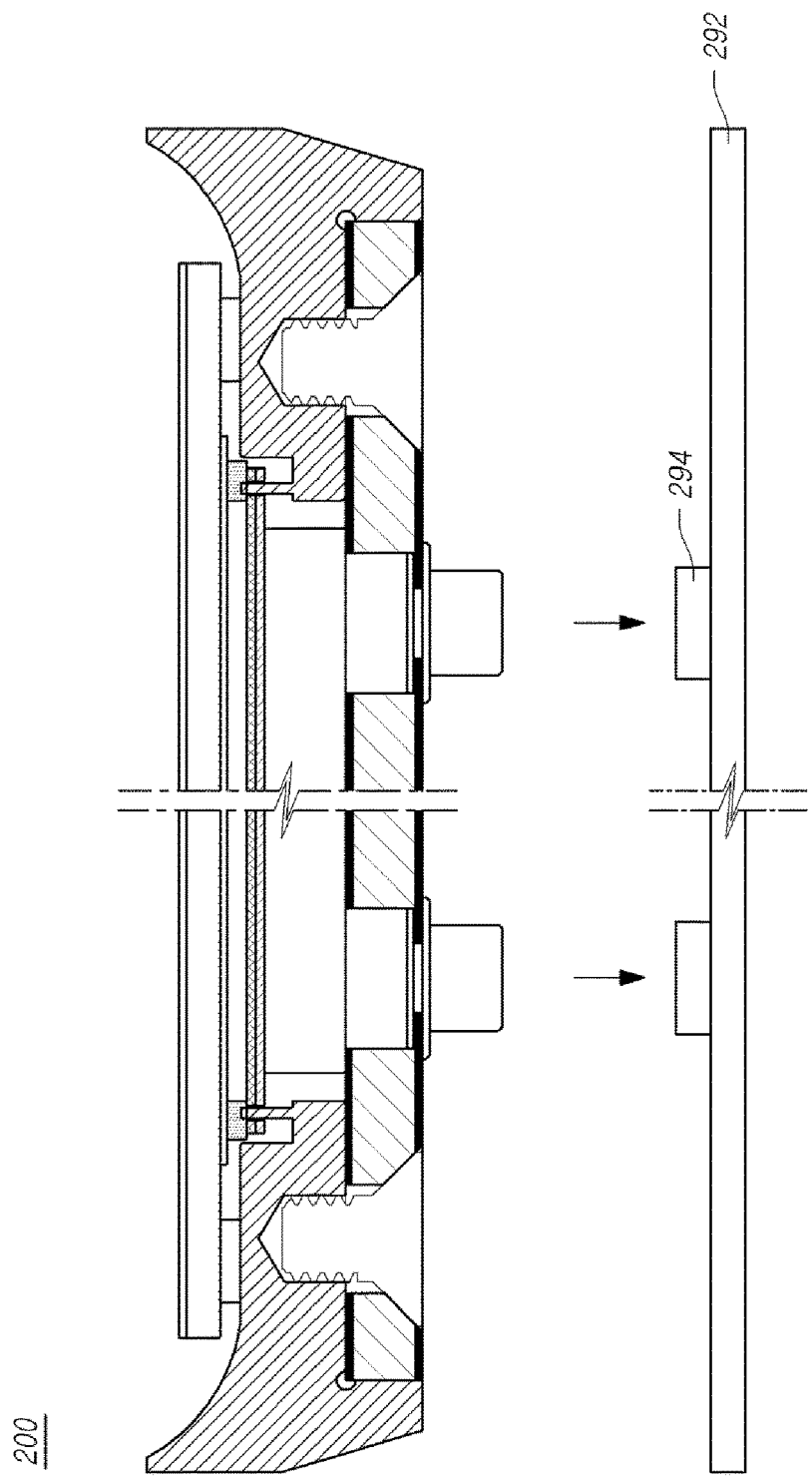

LIQUID CRYSTAL DISPLAY DEVICE COMPRISING A SCREW-SHAPED COMBINING MEMBER AFFIXING A MIDDLE FRAME TO A COVER BOTTOM THROUGH A FIRST GROOVE OF A CONTACTING PORTION

CROSS-REFERENCE TO RELATED APPLICATION

This application claims priority from and the benefit under 35 U.S.C. § 119(a) of Korean Patent Application No. 10-2014-0164176, filed on Nov. 24, 2014, which is hereby incorporated by reference for all purposes as if fully set forth herein.

BACKGROUND

1. Field of the Disclosure

The present disclosure relates to a liquid crystal display device.

2. Description of the Prior Art

With the development of information society, various types of requirements for a display device for displaying an image are increasing and, recently, various display devices, such as a Liquid Crystal Display (LCD), a Plasma Display Panel (PDP), and an Organic Light Emitting Diode Display Device (OLED), are being used.

The LCD among the display devices includes a display panel, a driving unit, a Back Light Unit (BLU), and the like. The display panel includes an array substrate, an upper substrate and a liquid crystal material layer. The array substrate includes a thin film transistor which is a switching element for controlling on and off of each pixel area. The upper substrate includes a color filter, a black matrix, and/or the like. The liquid crystal material layer is formed between the array substrate and the upper substrate. The driving unit is for controlling the thin film transistor. The BLU provides light to the display panel. The LCD is a device in which an arrangement state of a liquid crystal layer is controlled according to an electric field applied to a pixel (PXL) in a pixel area and a common voltage (Vcom) electrode, and thus transmittance of light is controlled.

In the case of the LCD, a backlight device providing light from the outside is necessary. The BLU may include a sub units such as a light source, a light guide plate and a reflecting plate. The LCD includes at least one frame or chassis as a support structure for supporting the sub units. The frame may include a cover bottom which supports the last rear portion of the BLU, a guide panel which supports a side surface of the BLU, and the like.

In addition, the LCD includes additional components for improving an aesthetic and outwardly visible appearance of the device, besides the above-mentioned cover bottom and the guide panel. Therefore, the number of parts increases and manufacturing cost increases.

In addition, since various parts of the LCD are attached by double-sided tapes or the like, strength and reliability of the product is reduced, and manufacturing cost increases.

Meanwhile, when the LCD is combined with an external support member, a strength of the combination between the LCD and the external support member is weak, and reliability is reduced.

SUMMARY

In this background, an aspect of the present disclosure is to provide a liquid crystal display device with a reduced number of parts, improved product strength and reliability, reduced manufacturing cost, reduced whole thickness, and reduced light leakage.

According to an aspect of the present disclosure, a liquid crystal display device according to the present disclosure comprises a liquid crystal display panel, a back light unit that emits light to the display panel, a middle frame that supports the display panel and is disposed on a side of the back light unit, and a cover bottom that contacts a lower surface of the back light unit.

In one embodiment, the middle frame includes a contacting portion which makes contact with a portion of an upper surface of the cover bottom, and a protruding portion which adjoins a side surface of the cover bottom and protrudes from the contacting portion toward a bottom surface of the cover bottom.

The liquid crystal display device according to the present disclosure has reduced number of parts, improved strength and reliability, reduced manufacturing cost, reduced thickness, and reduced light leakage.

BRIEF DESCRIPTION OF THE DRAWINGS

The above and other objects, features and advantages of the present disclosure will be more apparent from the following detailed description taken in conjunction with the accompanying drawings, in which:

FIG. 8 illustrates a combination of the liquid crystal display device of FIG. 6 and a display support bracket.

DETAILED DESCRIPTION OF THE EXEMPLARY EMBODIMENTS

Figure 1:
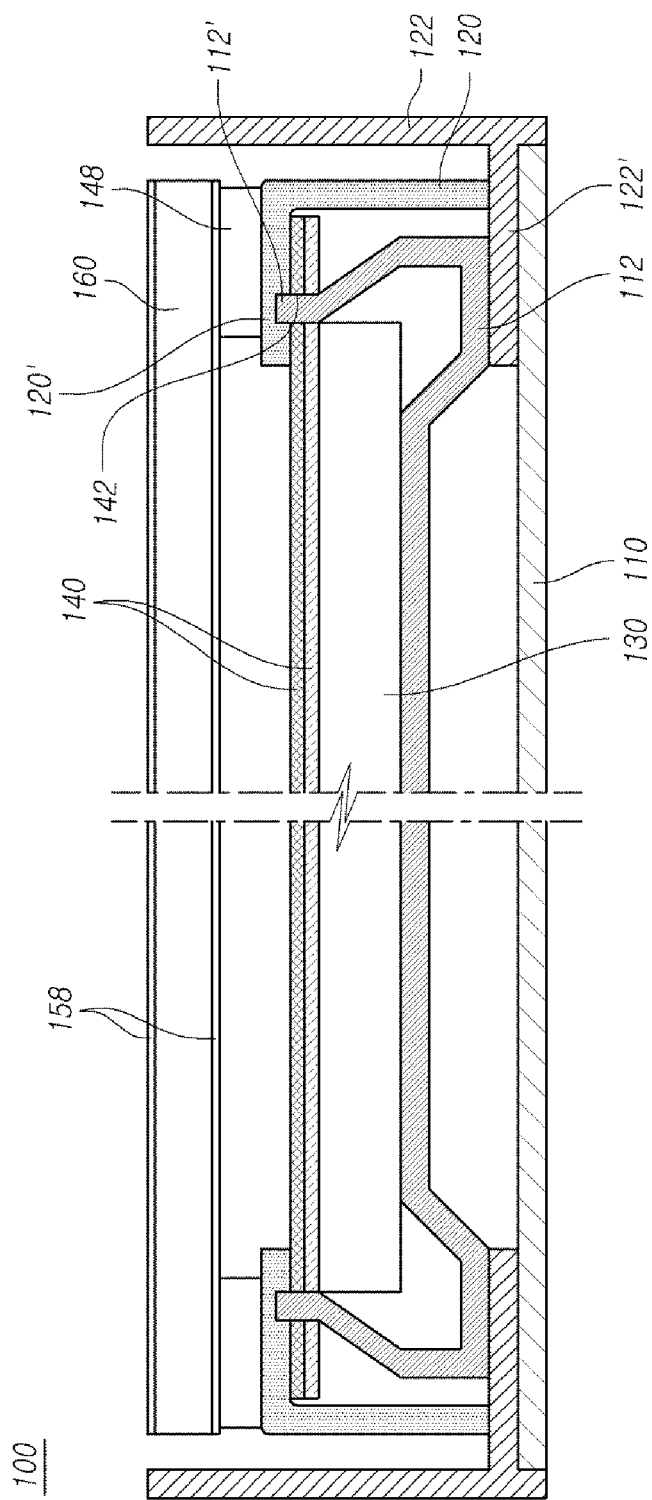
FIG. 1 illustrates a cross section of a liquid crystal display device.

Hereinafter, exemplary embodiments of the present invention will be described with reference to the accompanying drawings. In the following description, the same components will be designated by the same reference numerals although they are shown in different drawings.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component. Likewise, when it is described that a certain element is formed "on" or "under" another element, it should be understood that the certain element may be formed either directly or indirectly via a still another element on or under another element.

Hereinafter, embodiments are specifically described with reference to the drawings.

FIG. 1 illustrates a schematic cross section of a liquid crystal display device.

Referring to FIG. 1, the liquid crystal display device 100 may include a liquid crystal display panel 160 and a back light unit 130 which is disposed at a rear side of the liquid crystal display panel 160 and provides light to the liquid crystal display panel 160. Although it is not shown in the drawings, the back light unit 130 may include a reflecting plate, a light guide plate (or light guide panel), and the like.

In addition, the normal liquid crystal display device 100 may include at least one frame or chassis as a support frame for supporting the panel and the like, outside the liquid crystal display panel 160 and the back light unit 130.

Specifically, a guide panel 120 includes a step portion 120' for supporting the liquid crystal display panel 160, and receives the back light unit 130 under the liquid crystal display panel 160.

Meanwhile, a cover bottom 112 is combined with the step portion 120' of the guide panel 120, and covers a side surface and a rear surface of the back light unit 130. The cover bottom 112 includes a hang portion 112' passing through a groove 142 of at least one optical sheet 140 which is disposed between the liquid crystal display panel 160 and the back light unit 130, in order to fix the optical sheet 140.

The liquid crystal display panel 160 may include a polarizing plate 158 on both surfaces of the liquid crystal display panel 160. The liquid crystal display panel 160 is attached and fixed to the step portion 120' of the guide panel 120 by a supporting pad 148.

Meanwhile, the liquid crystal display device 100 may further include a bottom cover 110 and a middle cabinet 122 for protection of internal parts and for providing an aesthetic appearance and outwardly visible exterior to a product such as a TV.

The middle cabinet 122 supports and receives the side surface of the liquid crystal display panel 160 and the guide panel 120, and includes a protruding portion 122' making contact with the cover bottom 112. The bottom cover 110 may be spaced apart from the cover bottom 112, and an edge of the bottom cover 110 may support the protruding portion 122' of the middle cabinet 122.

The liquid crystal display device 100 has problems in which the number of parts increases due to appearance parts such as the middle cabinet 122 and the bottom cover 110, a manufacturing cost increases, and a thickness of the liquid crystal display device 100 increases due to these additional visible support parts.

In addition, since various frames 110, 112, 120 and 122 and each part in the liquid crystal display device 100 are attached by an adhesive such as a double-sided tape, a strength of a product is degraded, reliability is reduced, and a manufacturing cost increases due to a cost of the tape. In addition, since a height and an area for attaching the tape should be secured in order to attach the tape, the thickness of the liquid crystal display device 100 may become thicker and unnecessary space may increase.

In contrast, embodiments of the present specification provide a structure that mitigates the above-mentioned problems.

Figure 2:
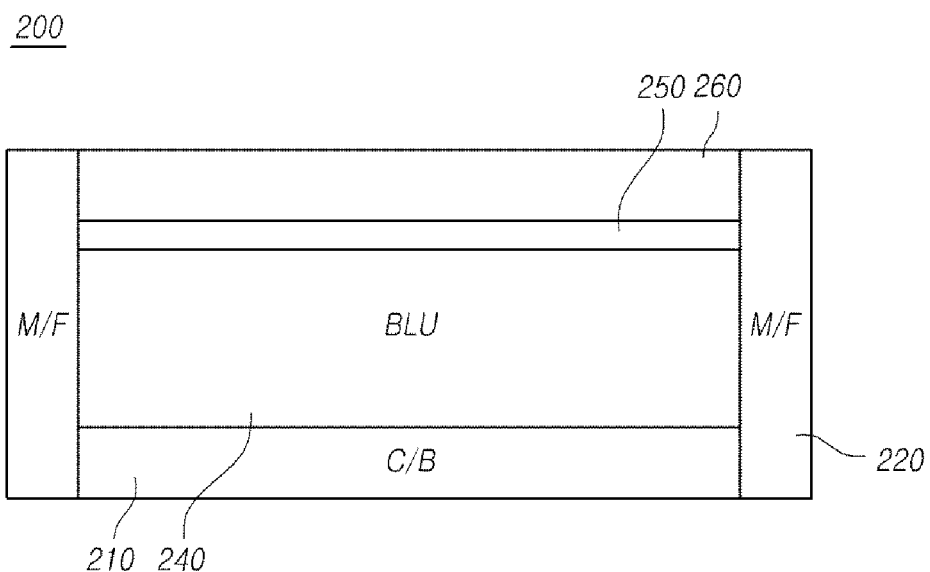
FIG. 2 illustrates a schematic cross section of a liquid crystal display device according to one or more embodiments.

FIG. 2 illustrates a schematic cross section of a liquid crystal display device according to one or more embodiments.

Referring to FIG. 2, the liquid crystal display device 200 according to embodiments includes a liquid crystal display panel 260, a back light unit 240 emitting light to the liquid crystal display panel 260, a middle frame 220 disposed at a side surface of the back light unit 240, and a cover bottom 210 supporting a lower surface of the back light unit 240.

Here, the middle frame 220 of the liquid crystal display device 200 includes a contacting portion (not shown) which makes contact with a portion of an upper surface of the cover bottom 210, and a protruding portion (not shown) which supports a side surface of the cover bottom 210.

The liquid crystal display panel 260 may include an array substrate, an upper substrate and a liquid crystal material layer. The array substrate includes a plurality of gate lines, a plurality of data lines, a pixel defined in an intersection area of the gate line and the data line, and a thin film transistor which is a switching element for controlling light transmittance of each pixel. The upper substrate includes a color filter, a black matrix, and/or the like. The liquid crystal material layer is formed between the array substrate and the upper substrate.

Meanwhile, a display panel to which the present invention is applied is not limited to the liquid crystal display panel. An embodiment of the present invention may be applied to all types of display devices using a back light for providing light to a display panel.

In addition, the liquid crystal display device 200 to which embodiments of the present invention are applied includes a Back Light Unit (BLU) 240 providing light to the liquid crystal display panel 260, and a driving circuit unit (not shown), in addition to the array substrate. The driving circuit unit (not shown) includes a timing controller (T-con), a data driver (D-IC), a gate driver (G-IC), a back light driving unit, and a power supplying unit supplying a driving power to driving circuits. Further, all or a part of the driving circuit unit may be formed on the liquid crystal panel according to a Chip On Glass (COG) or a Chip On Flexible printed circuit or Chip On Film (COF) mode, and a more detailed description of the driving circuit unit is omitted here.

Meanwhile, the BLU 240 is a device for providing the light to the liquid crystal display panel 260. The BLU 240 includes sub units such as a light source (not shown), a light guide plate (not shown) or a diffusion plate for diffusing the light to a whole area of the panel, and a reflecting plate (not shown) for reflecting the light toward the liquid crystal display panel 260.

The light source may include a light emitting diode, a light emitting diode strip, or the like, but is not limited thereto. All types of light sources capable of providing necessary light to a display panel may be used as the light source.

The light guide plate (not shown) may normally be formed of a rectangular and transparent plastic sheet obtained by a die cutting from a plastic sheet, or a pressing out, or an injection molding. The light from the light source such as a light emitting diode array is emitted to an edge of the light guide plate (not shown), totally reflected in the light guide plate, and is diffused while traversing a rear surface of the liquid crystal display panel 260. The light emitted through a flat upper surface of the light guide plate (not shown) functions as a back light of the liquid crystal display panel 260.

Meanwhile, at least one optical sheet 250 for improving a luminance, diffusing the light and protecting the light may be disposed on the light guide plate (not shown).

At least one frame (or chassis) may be used as a support structure for receiving and supporting the light source (not shown), the reflecting plate (not shown), the light guide plate (not shown), the BLU 240, and the like.

Specifically, the middle frame 220 may have a frame type. The middle frame 220 supports and receives the liquid crystal display panel 260 and a side surface of the BLU 240. The middle frame 220 supports a portion of the cover bottom 210 which supports the BLU 240 from the rear of the BLU 240.

Figure 3:
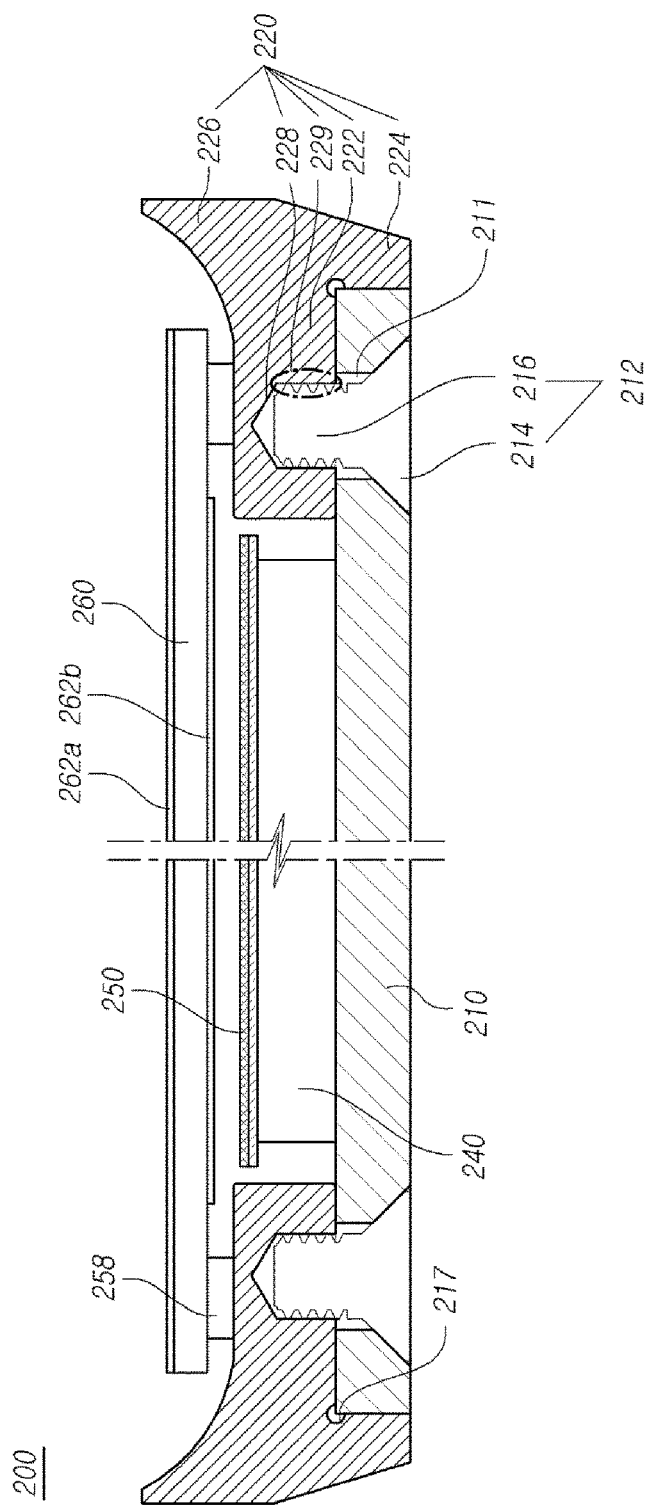
FIG. 3 illustrates a cross section of a liquid crystal display device according to an embodiment.

FIG. 3 illustrates a cross section of a liquid crystal display device according to an embodiment.

Referring to FIG. 3, the liquid crystal display device 200 may include a liquid crystal display panel 260, a back light unit 240 emitting light to the liquid crystal display panel 260, a middle frame 220 supporting an edge of the liquid crystal display panel 260 and disposed at a side surface of the back light unit 240, and a cover bottom 210 supporting a lower surface of the back light unit 240.

Here, the middle frame 220 may include a contacting portion 222 which makes contact with a portion of an upper surface of the cover bottom 210, and a protruding portion 224 which supports a side surface of the cover bottom 210.

Specifically, the liquid crystal display panel 260 includes an upper substrate and a lower substrate, and a liquid crystal layer for controlling a light transmittance is interposed between the upper substrate and the lower substrate.

The lower substrate of the liquid crystal display panel 260 includes a plurality of gate lines and a plurality of data lines. A plurality of pixels are defined by an intersection of the gate lines and the data lines. Each pixel includes a transistor which is a switching element, and a storage capacitor.

The upper substrate of the liquid crystal display panel 260 may include a color filter (R, G and B) and a black matrix. The color filter (R, G and B) is for converting light incident through the liquid crystal layer into a specific color light. The black matrix is for preventing a mixture of the color light.

Meanwhile, an upper polarizing plate 262*a* is disposed on the liquid crystal display panel 260, and a lower polarizing plate 262*b* is disposed under the liquid crystal display panel 260.

The lower polarizing plate 262*b* is attached to a rear surface of the lower substrate in the liquid crystal display panel 260, polarizes light incident from the back light unit 240, and emits the light to the lower substrate. The upper polarizing plate 262*a* is attached to an upper surface of the upper substrate in the liquid crystal display panel 260, polarizes light incident through the upper substrate, and emits the light to the outside.

The back light unit 240 of the liquid crystal display panel 200 may include a light source (not shown), a light guide plate (not shown) and a reflecting plate (not shown). The light source (not shown) generates light provided to the liquid crystal display panel 260. The light guide plate (not shown) guides the light from the light source toward the liquid crystal display panel 260. The reflecting plate (not shown) is disposed under the light guide plate, and reflects the light.

Here, the light source may include one light source or a combination of at least two light sources among a Cold Cathode Fluorescent Lamp (CCFL), an External Electrode Fluorescent Lamp (EEFL), and a Light Emitting Diode (LED).

The light guide plate includes a light incident surface to which the light is incident, and a body which changes a path of the light. The light guide plate has a plate form. The light guide plate changes the path of the light incident from the light source, and emits the light toward the liquid crystal display panel 260.

The reflecting plate is disposed at a rear surface of the light guide plate, and reflects incident light toward the liquid crystal display panel 260.

Meanwhile, at least one optical sheet 250 may be disposed between the liquid crystal display panel 260 and the back light unit 240. The optical sheet 250 is for improving efficiency of light emitted to the liquid crystal display panel 260. The optical sheet 250 diffuses and concentrates the light incident from the light guide plate, and provides the light to the liquid crystal display panel 260. To this end, the optical sheet 250 may include a diffusing sheet, a prism sheet, a reflective polarizing film, and the like.

The back light unit 240 is received in a space arranged by the cover bottom 210 and the middle frame 220.

The cover bottom 210 is a support for fixing the back light unit 240 from a rear direction of the back light unit 240. The cover bottom 210 may be defined as a frame or a plate structure which is formed of a material such as a metal. Although it is not shown in the drawings, a touch driving circuit and the like may be disposed at a portion of a rear surface of the cover bottom 210.

The cover bottom 210, for example, may include an electrolytic galvanized iron, an Advanced Composite Material (ACM) in which carbon fiber or carbon silicon fiber and thermal resistant resin such as epoxy resin or polyimide are combined, a honeycomb, or the like, but is not limited thereto, and may include material of various metal or plastic groups.

Meanwhile, the middle frame 220 is a quadrangle frame type structure having a frame type, and is connected to the cover bottom 210. The middle frame 220 is used to receive the back light unit 240 therein, which includes the light source, the reflecting plate, the light guide plate, and the like.

Specifically, the middle frame 220 includes the contacting portion 222 which makes contact with an edge of the upper surface of the cover bottom 210, and the protruding portion 224 which supports the side surface of the cover bottom 210. In addition, the middle frame 220 includes a groove 228 disposed in the contacting portion 222 in order to receive a combining member which combines the cover bottom 210 and the middle frame 220, and an inner serration 229 in the groove 228.

Here, the combining member which combines the cover bottom 210 with the middle frame 220 may be a screw 212. The screw 212 passes through a hole 211 formed in a portion of the edge of the cover bottom 210 to be screw-combined with the inner serration 229 of the groove in the contacting portion 222 of the middle frame 220. Thus, the middle frame 220 and the cover bottom 210 are combined and fixed.

In other words, in one or more embodiments, the contacting portion 222 of the middle frame 220 comprises a groove 228 with inner serrations 229. A hole 211 through the cover bottom 210 is configured to align with the groove 228 in the contacting portion 222 of the middle frame 220, and a screw-shaped combining member 212 is configured to affix the middle frame 220 to the cover bottom 210 by penetrating the groove 228 of the contacting portion 222 and the hole 211 in the cover bottom 210.

The liquid crystal display panel 260 is supported by a supporting pad 258 having an adhesive material, on an upper surface of the contacting portion 220 in the middle frame 220.

The middle frame 220 may include a high molecular plastic group, but embodiments are not limited thereto, and may include various materials.

The groove 228 is formed at a lower surface of the contacting portion 222 in the middle frame 220. An area where the groove 228 is not formed makes contact with the upper surface of the cover bottom 210. The groove 228 includes the inner serration 229 which has a shape to be screw-combined (or teeth-combined) with a screw thread in a screw portion 216 of the screw 212. The inner serration 229 may be disposed at the side surface of the groove 228. A plane shape of the groove may be a circle, ellipse or a polygon, but is not limited thereto.

Meanwhile, a surface of the protruding portion 224 in the middle frame 220 makes contact with the side surface of the cover bottom 210, and supports the cover bottom 210.

The cover bottom 210 and the middle frame 220 are combined and fixed by the screw combination between the screw portion 216 of the screw 212 and the inner serration 229 of the middle frame 220, and the back light unit 240 and the optical sheet 250 are disposed in an inner space generated through this.

A cross section of a head portion 214 having a size (or a diameter) larger than that of the screw portion 216 of the screw 212 may be a tapered shape (i.e., a screw of a countersunk head) of which an area becomes larger toward a lower surface of the cover bottom 210. The head portion 214 corresponds to a shape of the hole 211 formed in the edge of the cover bottom 210. In addition, the head portion 214 of the screw 212 does not have a step with respect to the lower surface of the cover bottom 210, and has a thickness corresponding to a thickness of the cover bottom 210. That is, the screw 212 is not exposed to the outside of the cover bottom 210, and a rear surface of the cover bottom 210 has a flat surface.

Meanwhile, a margin space 217 for a contact of the middle frame 220 and the cover bottom 210 exists at a boundary between the contacting portion 222 and the protruding portion 224 in the middle frame 220. The margin space 217 refers to a margin area which maintains the contact of the frame 220 and the cover bottom 210 when the middle frame 220 or the cover bottom 210 is expanded, contracted or changed by heat or mechanical force. In other words, in one embodiment, the middle frame 220 and a corner of the cover bottom 210 are spatially separated by a margin space 217 that is provided in a vicinity of a portion of the middle frame 220 where the contacting portion 222 and the protruding portion 224 of the middle frame 220 intersect.

Meanwhile, a side of the middle frame 220 may be curved toward the display panel. Specifically, the side (hereinafter, referred to as a panel protecting portion) 226 of the middle frame 220, that is, the portion (hereinafter, referred to as the panel protecting portion) 226 formed in a direction opposite to that of the protruding portion 224 in the middle frame 220 shown in FIG. 3, has a curved shape toward (i.e., upward in the drawing) the liquid crystal display panel 260 from the protruding portion 224. In other words, in one embodiment, the middle frame 220 comprises an additional protruding portion 226 that protrudes from the contacting portion 222 toward the liquid crystal display panel 260 and away from the cover bottom 210. However, this shape is only an example and as such the middle frame 220 according to embodiments is not limited thereto, and may include the panel protecting portion 226 having various shapes.

Such a shape prevents shaking in left and right directions of the liquid crystal display panel 260, protects the liquid crystal display panel 260 from an external environment, and forms a visible exterior portion of the liquid crystal display device 200.

In comparison with the normal liquid crystal display device 100 in FIG. 1, the normal liquid crystal display device 100 includes the cover bottom 112 supporting the back light unit 130 from a rear of the back light unit 130, and the guide panel 120 supporting the liquid crystal display panel 160 and disposed at the side surface of the cover bottom 112. In addition, the normal liquid crystal display device 100 may further include the middle cabinet 122 and the bottom cover 110 that form a visible exterior portion of the device 100.

In contrast, the liquid crystal display device 200 according to the disclosed embodiments, includes the cover bottom 210 and the middle frame 220 that protect the inner back light unit 240 and the liquid crystal display panel 260, and simultaneously form an exterior appearance or externally visible face of the device.

That is, the middle frame 220 simultaneously performs functions of the guide panel 120 and the middle cabinet 122 of the normal liquid crystal display device 100, and the cover bottom 210 simultaneously performs functions of the cover bottom 112 and the bottom cover 110 of the normal liquid crystal display device 100. Therefore, the number of parts is reduced, and a manufacturing cost is reduced. In addition, since two parts are combined to one part, a thickness of the product can be reduced.

Meanwhile, since various frames 110, 112, 120 and 122 and each part in the liquid crystal display device 100 are attached by an adhesive such as a double-sided tape, strength of a product is degraded, reliability is reduced, and a manufacturing cost increases due to a cost of the tape. In addition, since a height and an area for attaching the tape should be secured in order to attach the tape, the thickness of the liquid crystal display device 100 may become thicker and unnecessary space may increase.

In contrast, in the case of the liquid crystal display device 200 according to the embodiments, since the cover bottom 210 and the middle frame 220 are strongly combined by the screw-combination, an assembly of the liquid crystal display device 200 becomes simple, strength and reliability are improved, and a manufacturing cost is reduced. In addition, since the screw 212 is attachable and detachable, convenience of work in a process such as a repair or an inspection can be improved.

Figure 4:
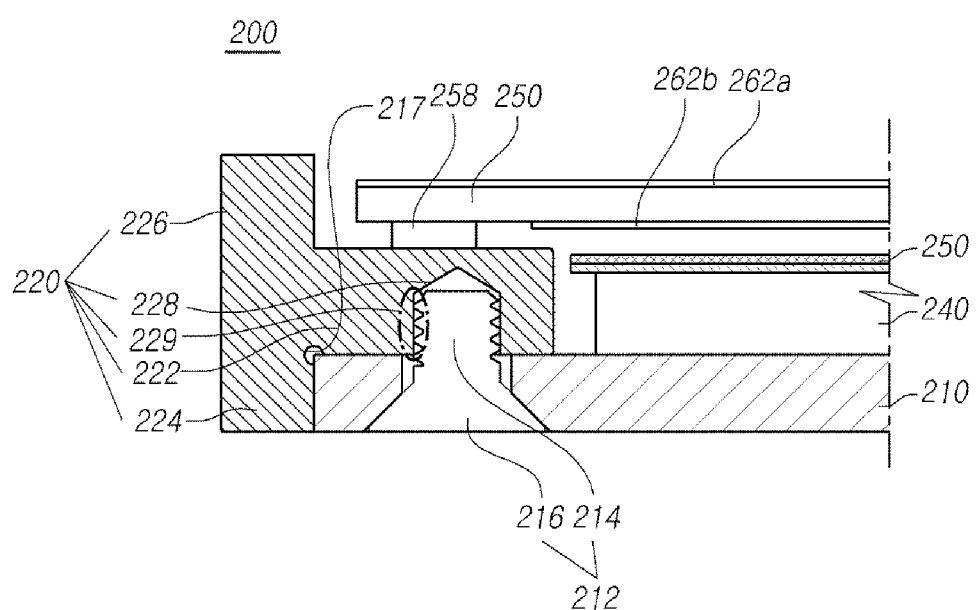
FIG. 4 illustrates a cross section of a liquid crystal display device according to another embodiment.

FIG. 4 illustrates a cross section of a liquid crystal display device according to another embodiment.

In the following, a description for elements identical to those in the liquid crystal display device of FIG. 3 is omitted.

Referring to FIG. 4, a side of the middle frame 220 of the liquid crystal display device 200 may be bent toward a liquid crystal display panel.

That is, as a variation from the middle frame 220 of the liquid crystal display device 200 shown in FIG. 3, a shape of a panel protecting portion 226 formed in a direction opposite to that of a protruding portion 224 which makes contact with a side surface of the cover bottom 210 may be a shape vertically bent from a contacting portion 222.

Such a shape prevents shaking in left and right directions of the liquid crystal display panel 260, protects the liquid crystal display panel 260 from an external environment, and completes a design of a product.

However, this is only an example for a convenience of description, and the middle frame according to the embodiments may include the panel protecting portion 226 having various shapes.

Figure 5:
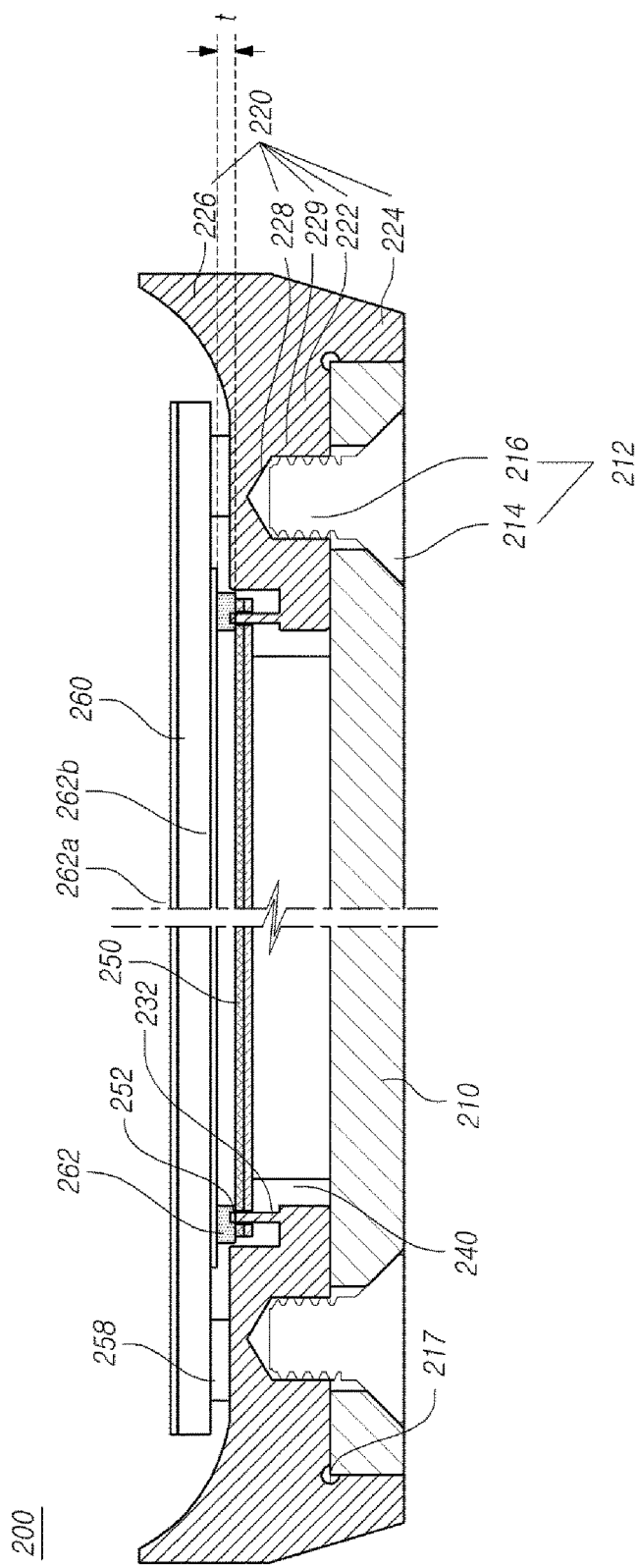
FIG. 5 illustrates a cross section of a liquid crystal display device according to yet another embodiment.

FIG. 5 illustrates a cross section of a liquid crystal display device according to another embodiment.

Referring to FIG. 5, the liquid crystal display device 200 may include at least one optical sheet 250 between the liquid crystal display panel 260 and the back light unit 240.

Here, the hole 252 is disposed in the edge area (or portion) of the optical sheet 250. The middle frame 220 may include a hang portion 232 which passes through the hole 252 in the edge area of the optical sheet 250 and fixes the optical sheet 250. Stated differently, in one or more embodiments, the middle frame 220 further includes a hang portion 232 that protrudes toward the display panel and affixes the middle frame to the optical sheet by penetrating through a hole 252 formed near an outer periphery of the optical sheet 250. A sheet fixing pad 262 may be disposed between the liquid crystal display panel 260 and the optical sheet 250, the sheet fixing pad 262 located above a region of the optical sheet 250 that is punctuated by the hole 252, the sheet fixing pad 262 covering the hole 252.

That is, the liquid crystal display device 200 has a structure in which the hang portion 232 disposed at the end of the contacting portion 222 is inserted into the hole 252 in the optical sheet 250 and thus the middle frame 220 and the optical sheet 250 are combined.

Meanwhile, the liquid crystal display device 200 may further include a sheet fixing pad 262 which is disposed between the liquid crystal display panel 260 and the optical sheet 250, and covers the hole 252 in the edge area of the optical sheet 250.

The sheet fixing pad 262 may have a frame shape in order to cover a whole edge of the optical sheet 250, and may correspond to an area where the hole 252 is formed.

In addition, a lower surface of the sheet fixing pad 262 may make contact with or overlap the hang portion 232 of the middle frame, which passes through the hole 252 in the optical sheet 250, an upper surface of the sheet fixing pad 262 may make contact with the liquid crystal display panel 260 or the lower polarizing plate 262b.

At this time, the sheet fixing pad 262 may include a flexible and soft material capable of preventing a light leakage phenomenon in which the light emitted from the back light unit 240 is leaked. Since the liquid crystal display panel 260 does not emit light autonomously, the liquid crystal display panel 260 displays an image by controlling transmittance of the light incident through the back light unit 240. The sheet fixing pad 262 prevents light leakage in an area except for the liquid crystal display panel 260, and thus the liquid crystal display device 200 can display an image of superior quality.

In addition, the sheet fixing pad 262 controls a vertical (up and down directions in FIG. 5) movement of the optical sheet 250, and prevents a breakaway of the optical sheet in a case of transportation of the optical sheet 250.

In addition, in a comparison with the normal liquid crystal display device 100, the normal liquid crystal display device 100 is a comparatively thick due to the combination structure of the cover bottom 112 and the hang portion 112'. In contrast, when the sheet fixing pad 262 according to another embodiment is applied to the liquid crystal display device 200, the liquid crystal display device 200 may become comparatively slim. In addition, a thickness of the sheet fixing pad 262 may be controlled, and thus a thickness of the liquid crystal display device 200 may also be controlled.

Figure 6:
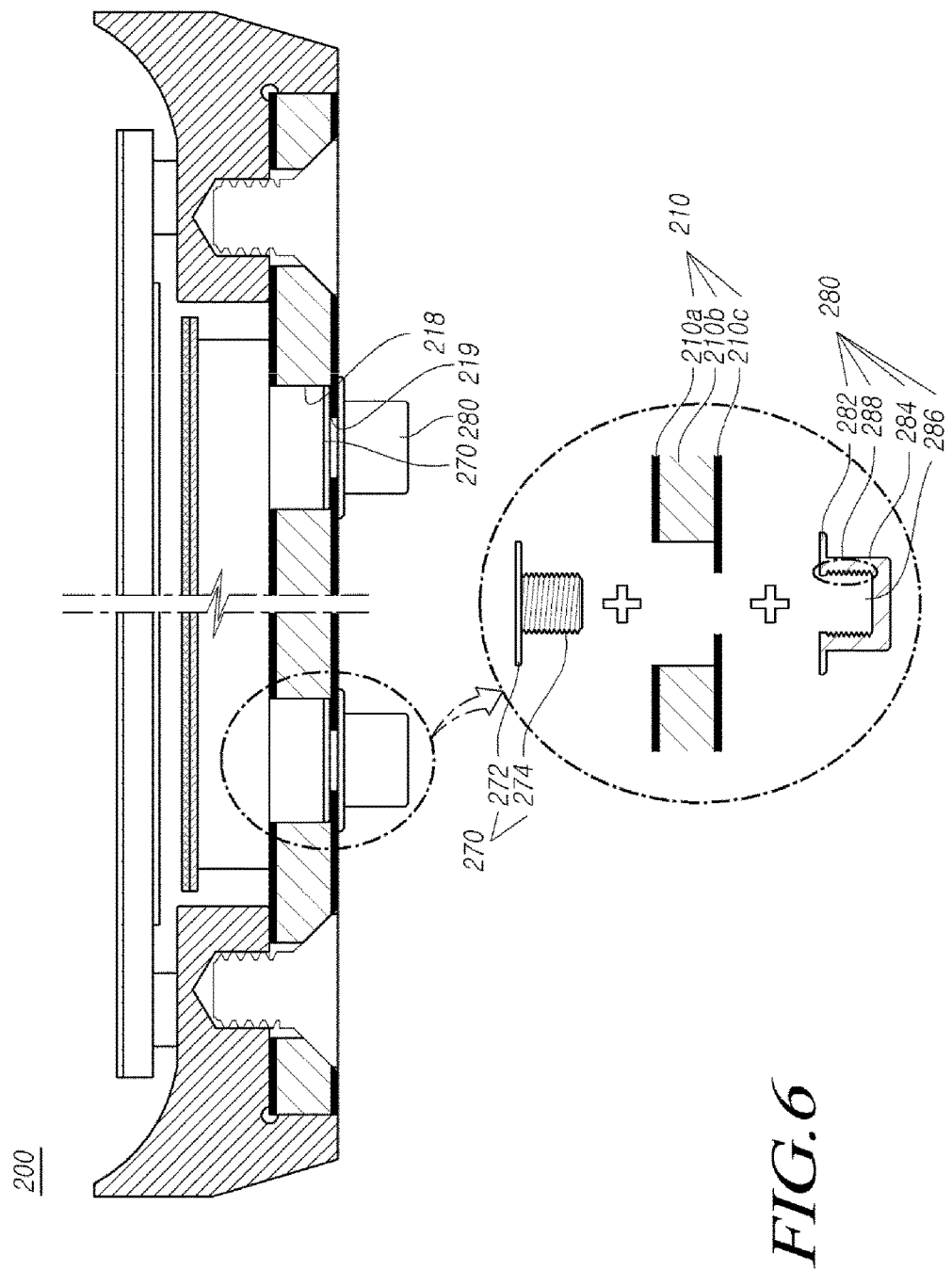
FIG. 6 illustrates a cross section of a liquid crystal display device according to another embodiment.
Figure 7:
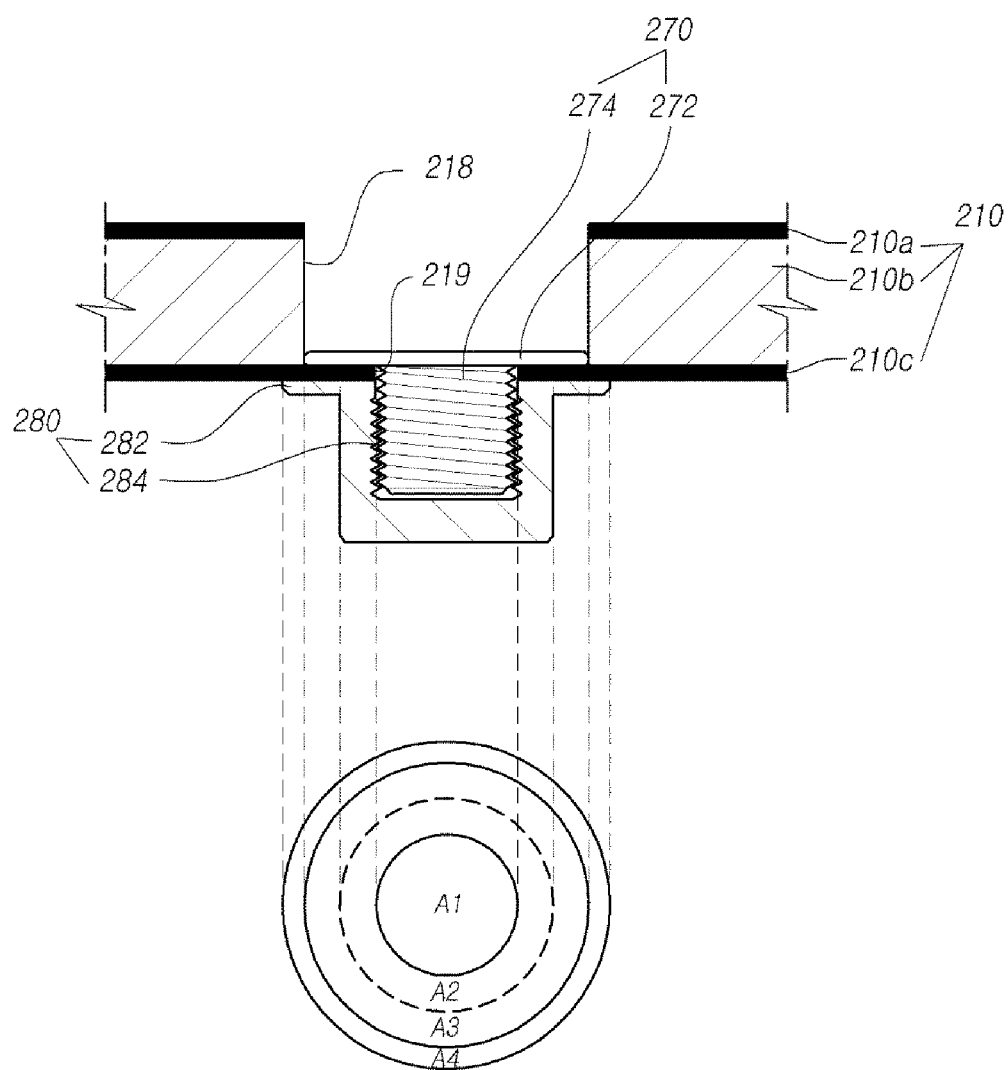
FIG. 7 illustrates a cross section in which a portion of the liquid crystal display device in FIG. 6 is enlarged.

FIG. 6 illustrates a cross section of a liquid crystal display device according to another embodiment. FIG. 7 illustrates a cross section in which a portion of the liquid crystal display device in FIG. 6 is enlarged. FIG. 8 illustrates a combination of the liquid crystal display device of FIG. 6 and a display support bracket.

Referring to FIGS. 6 to 8, the cover bottom 210 of the liquid crystal display device 200 may include a core layer 210b and skin layers 210a and 210c attached to both sides of the core layer 210b. Thus, the upper and bottom surfaces of the cover bottom 210 may be formed of skin layers 210a and 210c, and the cover bottom 210 may include a core layer 210b placed between the skin layers 210a and 210c.

Through a multi-layer structure including the core layer 210b and the skin layers 210a and 210c, the cover bottom 210 may secure strength, reliability and mechanical flexibility comparatively improved compared to a single layer structure.

Meanwhile, the liquid crystal display device 200 according to another embodiment may further include a first combining member 280 and a second combining member 270. The first combining member 280 attached to the cover bottom 210 includes a cylinder protruding portion 284 and a cylinder contacting portion 282 which has a cross sectional area A4 larger than a cross sectional area A2 of the cylinder protruding portion 284 and makes contact with an outside surface of the cover bottom 210. The first combining member 280 has an inner serration 284 disposed at an inside surface of a groove 286 which is dipped in an axis direction from a center of the cylinder contacting portion 282. In such embodiments, the cylinder protruding portion 284 protrudes from the cover bottom 210 toward a direction opposite to the display panel 260 and includes an internal groove 286 with inner serrations 288. The cylinder contacting portion 282 may be formed between the cylinder protruding portion 284 and the bottom surface of the cover bottom 210, the cylinder contacting portion 282 may contact an outer side of the bottom surface of the cover bottom 210. In one embodiment, the second combining member 270 is attached to the cover bottom 210 and includes a screw portion 274 and a head portion 272. The screw portion 274 penetrates a hole in the bottom surface of the cover bottom 210, is inserted into the internal groove 286 of the cylinder protruding portion 284, and is screw-combined with the inner serration 288 disposed on the internal groove 286. The head portion 272 has a cross sectional area A3 larger than cross sectional area A1 of the screw portion 274 and makes contact with an inner side of the bottom surface of the cover bottom 210. The second combining member 270 penetrates a groove formed through a substantial thickness of the cover bottom 210, the groove being axially aligned with the hole 219 in the bottom surface of the cover bottom 210.

Here, the hole 219 in the cover bottom 210 is disposed at an inside surface of the groove 218 in the cover bottom 210 so that an empty space is arranged between the cover bottom 210 and the back light unit 240.

Specifically, a plurality of the grooves 218 may be disposed in the cover bottom 210. The groove 218 is a structure for combining with a support member in the outside of the liquid crystal display device 200. The groove 218 is formed by a elimination of the skin layer 210a and the core layer 210b disposed at the inside of a predetermined area of the cover bottom 210. Therefore, the hole 219 is formed in a portion of the skin layer 210c disposed at the outside of the cover bottom 210 of which a portion is exposed. The hole 219 functions as a path where the first combining member 280 and the second combining member 270 are combined.

Meanwhile, the first combining member 280 includes the cylinder protruding portion 284, the cylinder contacting portion 282, and the inner serration 284 disposed in the inside of the groove 286. Here, the first combining member 280, for example, may be a pem nut, but is not limited thereto.

A shape of the inner serration 284 may be a shape to be screw-combined (or teeth-combined) with the screw portion 274 of the second combining member 270.

Here, the cross sectional area A4 of the cross section of the cylinder contacting portion 282 is larger than the cross sectional area A2 of the cross section of the cylinder protruding portion 284. Therefore, an area where the cylinder contacting portion 282 makes contact with the outside surface of the cover bottom 210 may become larger, the combination of the first combining member 280, the second combining member 270 and the cover bottom may become stronger, a superior strength may be secured, and reliability for external force may be improved.

Meanwhile, the second combining member 270 includes the screw portion 274 and the head portion 272. Here, the second combining member 270, for example, may be a screw, but is not limited thereto.

A shape of the screw portion 274 may have various types so as to be screw-combined with the inner serration 284.

Here, the cross sectional area A3 of the head portion 272 is larger than the cross sectional area A1 of the screw portion 274. Therefore, an area where the head portion 272 makes contact with the inside surface of the cover bottom 210 may become larger, the combination of the first combining member 280, the second combining member 270 and the cover bottom may become stronger, a superior strength may be secured, and reliability for external force may be improved.

The first combining member 280 and the second combining member 270 are combined with each other, and are supported by an external support member. For example, the liquid crystal display device 200 may be a wall-hanging TV, the first combining member 280 and the second combining member 270 are combined with a support member such as a display support bracket 294 fixed to an external wall 292 to fix the liquid crystal display device 200 to the external wall 292 (refer to FIG. 8). In other words, in one embodiment, a display support bracket 294 receives the cylinder protruding portion 284 of the first combining member 280. The cylinder protruding portion 284 of the first combining member 280, when received by the display support bracket 294, mounts the cover bottom 210 of the liquid crystal display device 200 onto the display support bracket 294.

In the case of the normal liquid crystal display device 100, a fixing method in which an integrated pem nut is caulked to a skin layer (not shown) of the bottom cover 110 is used, at this time, but since the skin layer (not shown) is thin, a sufficient strength cannot be secured.

In contrast, in the case of the liquid crystal display device 200 according to the embodiment, the area where the first combining member 280 makes contact with the inside surface of the skin layer 210c of the cover bottom 210, and the area where the second combining member 270 makes contact with the outside surface of the skin layer 210c of the cover bottom 210 increase, and thus strength and reliability can be improved.

To sum up, in the liquid crystal display device 200 according to the embodiment, the guide panel 120 and the middle cabinet 122 of the normal liquid crystal display device 100 are integrated to the middle frame 220, and the cover bottom 112 and the bottom cover 110 of the normal liquid crystal display device 100 are integrated to the cover bottom 210. Therefore, the liquid crystal display device 200 according to the embodiment can reduce the number of parts and reduce a manufacturing cost.

In addition, in the liquid crystal display device 200 according to the embodiment, a double-sided tape is removed, and the screw 212 is used. Therefore, the liquid crystal display device 200 according to the embodiment can improve a strength and reliability of a product, reduce a manufacturing cost, reduce a whole thickness, and remove an unnecessary space.

Meanwhile, the hang portion 232 for fixing the optical sheet 250 is included in the middle frame, and the hang portion covers the sheet fixing pad 262. Therefore, the vertical movement of the optical sheet 250 can be prevented, the light leakage phenomenon can be prevented, the thickness of the sheet fixing pad 262 can be thinned, and thus the thickness of the liquid crystal display device 200 can become slim.

Finally, in the liquid crystal display device 200, the area where the first combining member 280 makes contact with the inside surface of the skin layer 210c of the cover bottom 210, and the area where the second combining member 270 makes contact with the outside surface of the skin layer 210c of the cover bottom 210 increase, and thus the liquid crystal display device 200 can implement a superior strength and reliability.

Although various embodiments have been described up to now with reference to the accompanying drawings, the present invention is not limited to them.

In addition, since terms, such as "including," "comprising," and "having" mean that one or more corresponding components may exist unless they are specifically described to the contrary, it shall be construed that one or more other components can be included. Terms that are technical, scientific or otherwise are consistent in meaning with their meanings as understood by a person skilled in the art unless defined to the contrary. Common terms as found in dictionaries should be interpreted in the context of the related technical writings.

Although the embodiments of the present disclosure have been described for illustrative purposes, those skilled in the art will appreciate that various modifications, additions and substitutions are possible, without departing from the scope and spirit of the disclosure. Accordingly, the embodiments disclosed in the present disclosure are merely to not limit but describe the technical spirit of the present disclosure. Further, the scope of the technical spirit of the present disclosure is not limited by the embodiments. The scope of the present embodiments shall be construed on the basis of the accompanying claims in such a manner that all of the technical ideas included within the scope equivalent to the claims belong to the present disclosure.

What is claimed is:

1. A liquid crystal display device comprising:
   a liquid crystal display panel;
   a back light unit that emits light to the liquid crystal display panel;
   a middle frame that supports the liquid crystal display panel and is disposed on a side of the back light unit; and
   a cover bottom that contacts a lower surface of the back light unit,
   wherein the middle frame includes a contacting portion which makes contact with a portion of an upper surface of the cover bottom, and a protruding portion which adjoins a side surface of the cover bottom and protrudes from the contacting portion toward a bottom surface of the cover bottom,
   wherein a first hole through the cover bottom is configured to align with a first groove in the contacting portion of the middle frame, and a screw-shaped combining member is configured to affix the middle frame to the cover bottom by penetrating the first groove of the contacting portion and the first hole in the cover bottom in a first direction, wherein at least a part of the middle frame is in between the liquid crystal display panel and the screw-shaped combining member in the first direction, and wherein the middle frame comprises a panel protecting portion protruding in a direction opposite to the protruding portion.

2. The liquid crystal display device of claim 1, wherein the panel protecting portion has a curved shape toward the liquid crystal display panel.

3. The liquid crystal display device of claim 1, wherein the middle frame and a corner of the cover bottom are spatially separated by a margin space that is provided in a vicinity of a portion of the middle frame where the contacting portion and the protruding portion of the middle frame intersect.

4. The liquid crystal display device of claim 1, wherein the upper and bottom surfaces of the cover bottom are formed of skin layers and the cover bottom includes a core layer placed between the skin layers.

5. The liquid crystal display device of claim 1, further comprising:
a first combining member attached to the cover bottom, the first combining member including:
a cylinder protruding portion that protrudes from the cover bottom toward a direction opposite to the liquid crystal display panel and includes an internal groove with inner serrations, and
a cylinder contacting portion formed between the cylinder protruding portion and the bottom surface of the cover bottom, the cylinder contacting portion contacting an outer side of the bottom surface of the cover bottom and having a cross sectional area larger than a cross sectional area of the cylinder protruding portion; and
a second combining member attached to the cover bottom, the second combining member including:
a screw portion that penetrates a second hole in the bottom surface of the cover bottom, is inserted into the internal groove of the cylinder protruding portion, and is screw-combined with the inner serrations disposed on the internal groove, and
a head portion which has a cross sectional area larger than that of the screw portion and makes contact with an inner side of the bottom surface of the cover bottom.

6. The liquid crystal display device of claim 5, wherein the second combining member penetrates a second groove formed through a substantial thickness of the cover bottom, the second groove being axially aligned with the second hole in the bottom surface of the cover bottom.

7. The liquid crystal display device of claim 5, further comprising:
a display support bracket that receives the cylinder protruding portion of the first combining member, wherein the cylinder protruding portion of the first combining member, when received by the display support bracket, mounts the cover bottom of the liquid crystal display device onto the display support bracket.

8. The liquid crystal display device of claim 1, further comprising:
at least one optical sheet disposed between the liquid crystal display panel and the back light unit.

9. The liquid crystal display device of claim 8, wherein the middle frame further includes a hang portion that protrudes toward the liquid crystal display panel and affixes the middle frame to the at least one optical sheet by penetrating through a third hole formed near an outer periphery of the at least one optical sheet.

10. The liquid crystal display device of claim 9, further comprising: a sheet fixing pad disposed between the liquid crystal display panel and the at least one optical sheet, the sheet fixing pad located above a region of the optical sheet that is punctuated by the third hole, the sheet fixing pad covering the third hole.

11. A display device comprising:
a display panel;
a back light unit configured to emit light to the display panel;
a middle frame supporting the display panel and disposed on a side of the back light unit;
a cover bottom covering a lower surface of the back light unit; and
a combining member combining the middle frame and the cover bottom,
wherein the middle frame further comprises:
a first protruding portion configured to cover a side portion of the cover bottom;
a second protruding portion configured to protect the display panel and configured to protrude in a direction opposite to the first protruding portion; and
a groove configured to receive the combining member, and
wherein the cover bottom has a hole aligned with the groove in the middle frame,
wherein the combining member penetrates the hole and the groove in a first direction to combine the middle frame to the cover bottom, and
wherein at least a part of the middle frame is in between the display panel and the combining member in the first direction.

12. The display device of claim 11, wherein the combining member includes a screw.

13. The display device of claim 12, wherein the combining member further comprises a screw head, and wherein the screw head is positioned at the cover bottom.

14. The display device of claim 11, wherein the second protruding portion has a curved shape.

* * * * *